(12) United States Patent
Alzingre et al.

(10) Patent No.: US 11,977,406 B2
(45) Date of Patent: May 7, 2024

(54) PASSIVE HAPTIC INTERFACE

(71) Applicant: Moving Magnet Technologies, Besançon (FR)

(72) Inventors: Jean-Daniel Alzingre, Larnod (FR); Antoine Foucaut, Montarlot les Rioz (FR); Olivier Pajot, Belmont-sur-Lausanne (CH)

(73) Assignee: Moving Magnet Technologies, Besançon (FR)

( * ) Notice: Subject to any disclaimer, the term of this patent is extended or adjusted under 35 U.S.C. 154(b) by 0 days.

(21) Appl. No.: 17/633,514

(22) PCT Filed: Aug. 6, 2020

(86) PCT No.: PCT/FR2020/051444
§ 371 (c)(1),
(2) Date: Feb. 7, 2022

(87) PCT Pub. No.: WO2021/023951
PCT Pub. Date: Feb. 11, 2021

(65) Prior Publication Data
US 2022/0300026 A1    Sep. 22, 2022

(30) Foreign Application Priority Data

Aug. 7, 2019   (FR) ...................................... 1909057

(51) Int. Cl.
*G06F 3/01*     (2006.01)
*G05G 1/08*     (2006.01)
(Continued)

(52) U.S. Cl.
CPC ................. *G05G 5/03* (2013.01); *G05G 1/08* (2013.01); *G05G 5/06* (2013.01); *G05G 9/047* (2013.01);
(Continued)

(58) Field of Classification Search
CPC .. G05G 5/03; G05G 1/08; G05G 5/06; G05G 9/047; G05G 2009/04707;
(Continued)

(56) References Cited

U.S. PATENT DOCUMENTS 3,855,560  A  * 12/1974  Ward ...................... H02K 49/00
                                                    310/156.64
6,182,370  B1 *  2/2001  Baur ..................... G01D 5/2451
                                                    33/DIG. 1
(Continued)

FOREIGN PATENT DOCUMENTS

CN         108400045 A       8/2018
CN         108400046 A       8/2018
(Continued)

OTHER PUBLICATIONS

International Search Report for International Application No. PCT/FR2020/051444 dated Oct. 30, 2020, 2 pages.
(Continued)

*Primary Examiner* — Jose R Soto Lopez
(74) *Attorney, Agent, or Firm* — TraskBritt

(57) ABSTRACT

A passive haptic interface includes a first element which is rotatably movable about an axis or translatably movable along an axis, the first movable element rotating or moving opposite a second fixed element. The first movable element has a first plurality of magnetic poles spaced periodically at a pole pitch Ps and in the direction of movement, and the second fixed element has a second plurality of magnetic poles periodically spaced at a pole pitch Pr and in the direction of movement, where Ps and Pr are different numbers. A periodic stress is created by the magnetic interaction between the first movable element and the second fixed
(Continued)

element in a period Pt. The pole pitches Ps and Pr are chosen such that Pt is strictly less than the smallest of the pitches Ps and Pr.

14 Claims, 8 Drawing Sheets

(51) Int. Cl.
*G05G 5/03* (2008.04)
*G05G 5/06* (2006.01)
*G05G 9/047* (2006.01)
*H01H 19/11* (2006.01)

(52) U.S. Cl.
CPC ... *H01H 19/11* (2013.01); *G05G 2009/04707* (2013.01); *G05G 2009/04781* (2013.01)

(58) Field of Classification Search
CPC ......... G05G 2009/04781; H01H 19/11; H01H 2003/506; G06F 3/0362
See application file for complete search history.

(56) References Cited

U.S. PATENT DOCUMENTS

| | | | | |
|---|---|---|---|---|
| 6,380,733 B1* | 4/2002 | Apel | ............ | G05G 1/10 74/10.41 |
| 6,812,816 B1* | 11/2004 | Easton | ............ | G01D 5/145 335/207 |
| 7,109,469 B2* | 9/2006 | Hayashi | ............ | H01H 25/06 345/157 |
| 8,350,562 B2* | 1/2013 | Gailledrat | ............ | H01H 36/0006 324/207.21 |
| 9,423,894 B2* | 8/2016 | Olsson | ............ | G06F 3/0338 |
| 9,557,194 B2* | 1/2017 | Both | ............ | F24C 7/082 |
| 9,600,071 B2* | 3/2017 | Rothkopf | ............ | G06F 3/016 |
| 10,121,617 B2* | 11/2018 | Rutledge | ............ | G06F 3/0338 |
| 10,122,251 B2* | 11/2018 | Keats | ............ | H02K 1/146 |
| 10,185,397 B2* | 1/2019 | Yoneoka | ............ | G06F 1/169 |
| 10,203,717 B2* | 2/2019 | Olsson | ............ | G06F 3/0338 |
| 10,528,074 B1* | 1/2020 | Olsson | ............ | G06F 3/0338 |
| 10,705,616 B2* | 7/2020 | Bagley | ............ | H02K 37/04 |
| 10,788,901 B2* | 9/2020 | Olsson | ............ | G06F 3/0346 |
| 10,921,162 B2* | 2/2021 | Nobes | ............ | G01D 5/342 |
| 2007/0188454 A1* | 8/2007 | O'Sullivan | ............ | G09G 5/08 345/163 |
| 2007/0267283 A1* | 11/2007 | Hiroe | ............ | H01H 5/02 200/179 |
| 2009/0273423 A1* | 11/2009 | Kramlich | ............ | G05G 5/03 335/306 |
| 2011/0037546 A1* | 2/2011 | Marie | ............ | G06F 3/016 335/230 |
| 2012/0326817 A1* | 12/2012 | Kayama | ............ | G05G 5/05 335/207 |
| 2014/0220534 A1* | 8/2014 | Shin | ............ | G09B 23/18 434/301 |
| 2015/0221426 A1* | 8/2015 | Furuki | ............ | H01H 5/02 335/219 |
| 2018/0123437 A1* | 5/2018 | Khoshkava | ............ | H02K 1/223 |
| 2018/0299295 A1* | 10/2018 | Eisenbeis | ............ | G01D 7/007 |
| 2019/0286184 A1* | 9/2019 | Takahashi | ............ | G05G 1/08 |

FOREIGN PATENT DOCUMENTS

| | | |
|---|---|---|
| EP | 1167109 B1 | 8/2005 |
| FR | 2908903 B1 | 9/2010 |
| JP | 2016-170886 A | 9/2016 |
| WO | 2013/023922 A1 | 2/2013 |
| WO | 2020/074605 A1 | 4/2020 |

OTHER PUBLICATIONS

International Written Opinion for International Application No. PCT/FR2020/051444 dated Oct. 30, 2020, 5 pages.

* cited by examiner

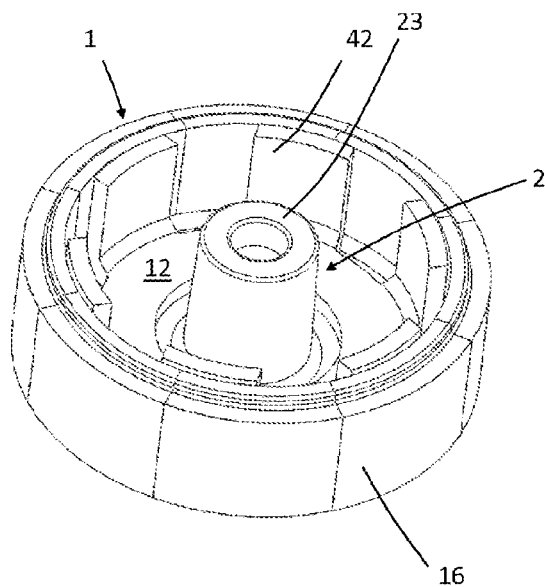
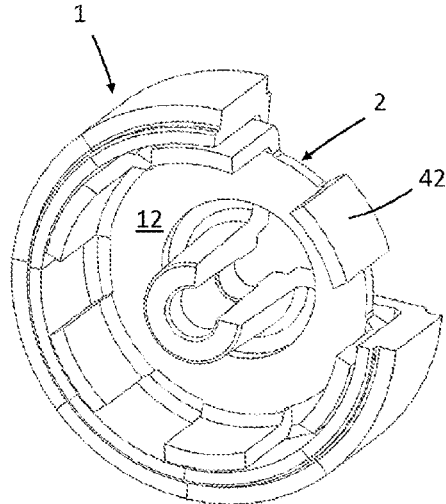
FIG. 13A    FIG. 13B
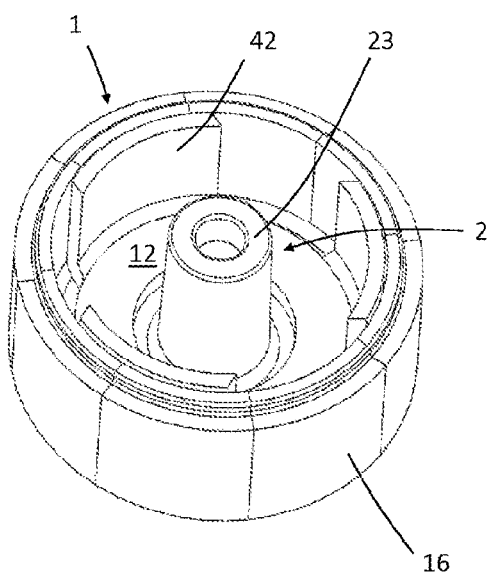
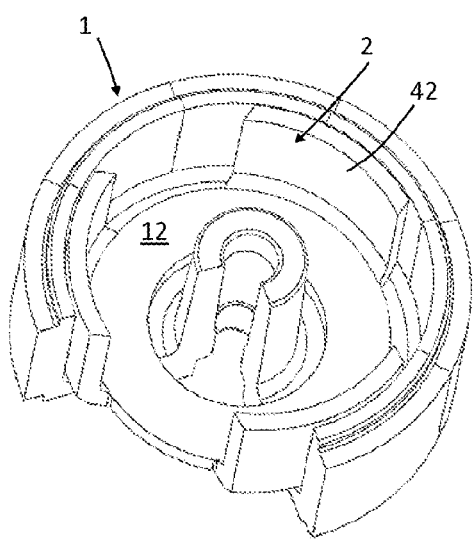
FIG. 14A    FIG. 14B

PASSIVE HAPTIC INTERFACE

CROSS-REFERENCE TO RELATED APPLICATIONS

This application is a national phase entry under 35 U.S.C. § 371 of International Patent Application PCT/FR2020/051444, filed Aug. 6, 2020, designating the United States of America and published as International Patent Publication WO 2021/023951 A1 on Feb. 11, 2021, which claims the benefit under Article 8 of the Patent Cooperation Treaty to French Patent Application Serial No. 1909057, filed Aug. 7, 2019.

TECHNICAL FIELD

The present disclosure relates to a passive haptic interface, that is to say, one that can be manipulated by the finger or the hand, possibly even by the foot of a user, and providing a felt variable stress without power consumption.

The present disclosure applies to, for example, an office automation computer control interface or to a control interface inside a motor vehicle or else to a control interface of a household appliance.

BACKGROUND

Manual haptic devices are known using a magnetic interaction between a fixed part and a movable part, these two parts being opposite one another and each comprising a magnet, or one comprising a magnet and the other comprising a cut soft ferromagnetic element to form different magnetic poles.

French Patent FR2908903 describes an indexing device comprising a movable control member held in at least one indexing position by a notching means. This patent describes different solutions, always providing:
  a) a metallic element having protuberances, and
  b) a magnet or two magnets each having a pole directed toward the metallic element and a second pole directed toward the side opposite the metallic element.

This solution has several drawbacks. The magnetic interaction ensuring the indexing is concentrated on one (in the case of one magnet) or two (in the case of two diametrically opposed magnets) teeth, which implies a fairly high and localized attractive force. The consequence is a poor torque/magnet volume ratio.

In addition, the solutions proposed by this patent come up against a problem of size limiting the possibilities for miniaturization: when the number of protuberances formed on the metallic element becomes large, it is necessary to reduce the section of the magnet or of the pair of magnets in order to prevent the generated magnetic field from interacting with several neighboring protuberances. However, by reducing the section of the magnet, torque is lost, and the indexing resistance is attenuated until it is no longer noticeable. The resolution of the indexing is limited by the size of the pitches between the teeth, which must be greater than the size of the magnet. These embodiments therefore do not allow high indexing resolutions to be achieved.

Chinese Patent CN108400046 describes a device formed by an annular surface and several static magnets arranged alternately on the annular surface and at least provided with two pieces of opposing movable magnets on the rotating components. The moving and static magnets are arranged sequentially to effect homopolar repulsion and heteropolar attraction.

This solution is not satisfactory because it also has great stiffness and poor resolution, which is necessarily limited to the pitch of the magnets. Furthermore, it requires a large number of magnets to produce a large number of notches. This solution also presents industrialization difficulties, because it requires the complex assembly of small parts.

European Patent Application EP1167109 describes a device for generating selection positions that comprises at least one base body that is surrounded at least partially by a housing, which bears a discoidal body, which is held relative to the base body by way of a basic position magnet arrangement that is to be moved relative to the base body, and also comprises a position arrangement by way of which at least the position of the discoidal body with respect to the housing is to be determined. It comprises at least one stator body including at least one magnetic element and a shaft guide recess, the base body consists of a hollow rotor body that is to be moved relative to the magnetic elements and that includes at least one position indicator toothed ring including at least one position indicator tooth, and a shaft element that is arranged in the shaft guide recess, and in that a disc body recess is provided in the housing. This embodiment allows only mediocre resolution because the number of notches is limited to the number of teeth that can be made, phased and aligned with the stator.

WIPO Patent Application Publication WO2013023922 describes a control device comprising an actuating element with haptic feedback, this element having a touch-sensitive control surface, the actuating element being able to be actuated by an operator using a gripping member. This device comprises a first and a second flat component made up of a ferromagnetic material and oriented so that their large surfaces are parallel to one another, the first flat component being able to be driven in translation in a guided manner horizontally with respect to the second flat component, which remains fixed, the first flat component forming the control element or entirely or partially transmitting its movement to the control element. This device also comprises a coil or an electrical conductor arranged between the flat components and assigned to a first pole shoe that is connected to the second flat component and protrudes from the first flat component. By applying a current to the coil or the conductor, it is possible to create a magnetic field by which the first flat component can, from a rest position, be driven in horizontal translation with respect to the second flat component to a movement position.

This solution is not passive, but requires an electrical supply of the coils to power the coils.

Japanese Patent JP2016170886 describes a device comprising a sensor comprising a first element formed by a plurality of magnetized parts at predetermined angular intervals along a circumferential direction, and a second element using the plurality of first magnets. A second magnetized portion at a predetermined angular interval along the circumferential direction is positioned so as to be able to face a magnetized portion on the outer side in the circumferential direction, and based on the rotation operation.

WIPO Patent Application Publication WO2020074605 discloses a magnetic rotary actuator for a motor vehicle control unit, with a fixed part and a rotary member that can be rotated relative to the fixed part, the magnetic rotary actuator having a magnetic locking sensation that comprises a plurality of magnetic locking positions, and the fixed part and the rotary member each comprise at least two separately formed magnetic members that cooperate to generate the plurality of magnetic detent positions. For each notch, only one rotor magnet participates in the torque; the stresses are asymmetrical and the ratio between the volume of magnets and the torque produced is poor.

In these devices, it is possible to give the user the feeling of passing by a succession of notches during manipulation of the movable element, the number of successive notches being determined by the highest number of magnetic polarities on each of the pieces. These notches correspond to the various stable magnetic positions between the fixed and movable parts. For example, in French Patent FR2908903, if the ferromagnetic part comprises sixteen (16) periodic patterns and the magnetized part comprises two magnets, the number of notches felt is then sixteen (16) over a complete rotation of the movable part.

When there is a need to create a large number of notches, for example seventy-two (72), over a complete rotation of the movable part (or over a given angle or linear movement), these devices of the prior art have the drawback of requiring a large number of magnets or ferromagnetic poles. When this relatively large number of notches is coupled with a need for miniaturization, the difficulty of producing the solution on an industrial scale then becomes significant with small elements that are difficult to achieve with the set of tight tolerances to be maintained.

Moreover, in many haptic devices, it is often necessary to implement a position sensor in order to be able to control the operation of a device, such as, for example, the movement of a computer pointer when the haptic interface is a mouse, or of a cursor on a dashboard screen, these examples not being limiting. The devices of the prior art often use optical or magnetic sensors that are simply placed near the haptic device, making the solution either bulky or uneconomical.

BRIEF SUMMARY

The present disclosure aims to overcome the drawbacks of the state of the art by allowing a more economical industrial production of the movable and fixed elements of a passive magnetized haptic interface, "passive" meaning that the haptic effect is obtained without a power supply.

To do this, the present disclosure proposes to produce a determined number of notches felt by the user by associating a fixed part and a movable part, each having fewer magnetic poles than the number of notches felt, while remaining passive, that is to say, without using an electric coil and without consuming electrical energy.

It is also in the object of the present disclosure to provide a simple and economical solution in order to install a position sensor in a haptic device.

More precisely, the present disclosure relates to a passive haptic interface comprising a first element that is rotatably movable about an axis or translatably movable along an axis, the first movable element rotating or moving opposite a second fixed element, the first movable element having a first plurality of magnetic poles spaced periodically at a pole pitch Ps and in the direction of movement, the second fixed element having a second plurality of magnetic poles spaced periodically at a pole pitch Pr and in the direction of movement, where Ps and Pr are different numbers, a periodic stress being created by the magnetic interaction between the first movable element and the second fixed element in a period Pt, wherein Ps and Pr are chosen such that Pt is strictly less than the smallest of the pitches Ps and Pr.

Preferably, the magnetic element comprises a single magnet having a magnetization that varies periodically.

"Plurality of magnetic poles" means a significant number, greater than 4, with a regular and constant distribution.

Preferably, the number of periods of the periodic stress is equal to the least common multiple of the numbers of periods of magnetic poles at the first movable element and at the second fixed element.

In a variant, one of the first movable element or the second fixed element comprises a cylindrical permanent magnet having an alternation of North and South poles forming the first plurality of magnetic poles, the other of the first movable element or the second fixed element has a plurality of teeth connected by a ring and forming the second plurality of magnetic poles, the teeth and ring being made of a soft ferromagnetic material, the period Pt of magnetic interaction being at least two times less than the smallest of the pitches Ps and Pr. In fact, the smallest common multiple between Ps and Pr, in the case of a closed rotary embodiment, corresponds to a value at least two times greater than the total number of magnetic poles.

In another variant, the first movable element and the second fixed element comprise a permanent magnet having an alternation of North and South poles forming the pole pitches Ps and Pr.

Alternatively, the second fixed element comprises a magnet having a unidirectional magnetization oriented along the axis and it comprises, axially on either side, two ferromagnetic discs (7a, 7b) made from soft iron extended radially and each by a plurality of 2π/Ps periodic teeth (42) spaced by the pole pitch Ps expressed in radians.

According to a variant, the second fixed element comprises a magnet having a unidirectional magnetization oriented along the axis and it comprises, axially on either side, two ferromagnetic discs made from soft iron extended radially and each by a plurality of 2π/(2*Ps) periodic teeth spaced by the pole pitch Ps multiplied by 2 and spaced between each disc of the pitch Ps expressed in radians.

According to another variant, the first movable element comprises two discs axially on either side of a unipolar permanent magnet and the second fixed element comprises a disc made from a soft ferromagnetic material, the discs each being extended radially by teeth, respectively, radially facing one another and spaced by the pitch Ps.

The present disclosure also relates to a linear passive haptic interface, wherein the first movable element comprises a permanent magnet magnetized transversely to the movement of the first movable element along the axis and positioned transversely between two toothed elements made from a soft ferromagnetic material having teeth and in that the second fixed element is made from a ferromagnetic material comprising teeth forming bars and extending linearly, the first fixed element moving linearly above the second fixed element.

The present disclosure also relates to a spherical passive haptic interface, wherein the first movable element comprises a ball joint capable of moving in rotation about three orthogonal axes, in that the ball joint comprises a set of teeth extending radially, and in that the second fixed element is formed by a plurality of fixed elements in the form of a stack of sheets of soft ferromagnetic material on either side of discrete permanent magnets oriented perpendicularly to the sheets, the sheets being extended radially by teeth facing the ball joint.

It is also in the object of the present disclosure to allow the economical production of a haptic interface. The present disclosure particularly relates to a rotary haptic interface, the first movable element comprising a ring of permanent magnets extending axially secured to a disc part, the disc part being extended axially in a direction opposite the magnets by a magnetic plate used for the position detection of the first movable element, and the second fixed element comprising a ring made from a soft ferromagnetic material extended by teeth facing the ring of permanent magnets.

According to a variant, the ring of magnets, the disc part and the magnetic plate are made from a single material with an injected plastic binder that can magnetize itself permanently.

In another variant, the disc part is made from an injected plastic binder material on which the magnetic plate is securely fixed.

Finally, the plate can be made of a plastic binder material injected into the disc part.

BRIEF DESCRIPTION OF THE DRAWINGS

Other features and advantages of the present disclosure will become clear upon reading the following detailed embodiments, with reference to the accompanying figures, which respectively show:

FIGS. 13A and 13B, two views of the same alternative embodiment of a device according to the present disclosure;

FIGS. 14A and 14B, two views of the same other alternative embodiment of a device according to the present disclosure;

DETAILED DESCRIPTION

Figure 1:
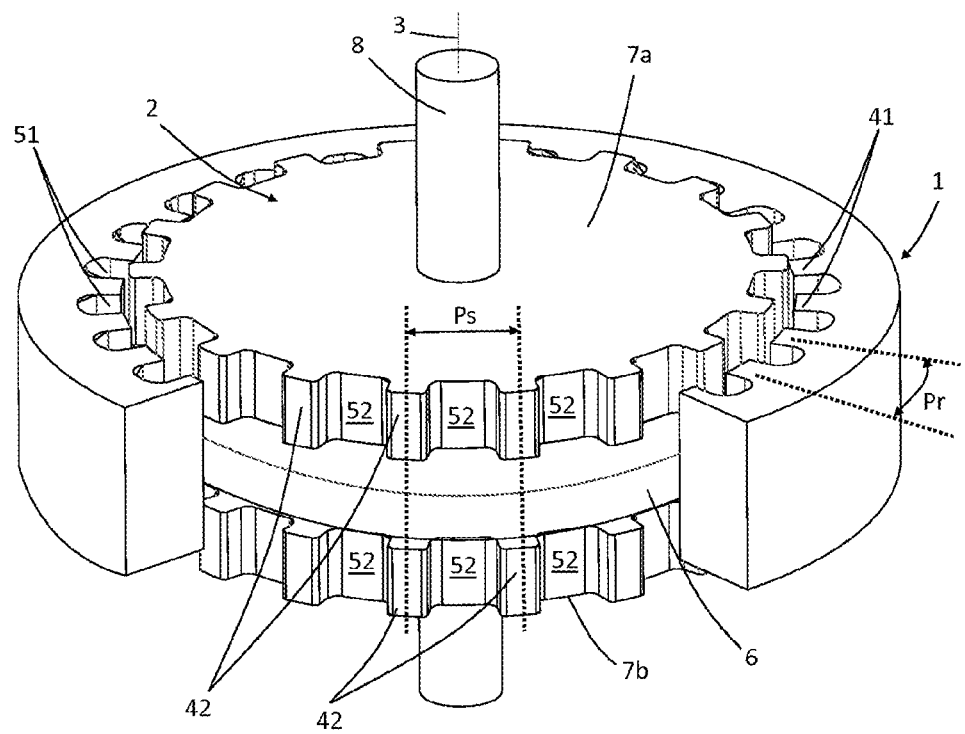
FIG. 1, a partial sectional view of a device according to a first embodiment of the present disclosure.

FIG. 1 shows a first embodiment of a rotary haptic interface according to the present disclosure. It comprises a first movable element (1) here in the form of a ring, the outer surface of which is cylindrical and may optionally be textured (not visible here) in order to improve the grip or digital actuation by a user. The inner surface of this movable element (1) has a succession of teeth (41), oriented radially relative to the axis (3) of rotation, and notches (51), defining a pole pitch Pr. This first movable element (1) is made from a soft ferromagnetic material, for example, a steel or an iron alloy. A second fixed element (2) is positioned inside this first movable element (1) and radially facing the first movable element (1). This second fixed element comprises a permanent magnet (6) in the form of a disc, the magnetization of which is directed axially. Positioned axially on either side of this magnet (6) are two ferromagnetic discs (7a, 7b) made from soft iron, each extended radially by a plurality $2\pi/Ps$ of periodic teeth (42) spaced by a pole pitch Ps, with Ps expressed in radians, and as many notches (52). The teeth (42) extend radially in the direction of the first movable element (1). The discs (7a, 7b) as well as the magnet (6) here are secured to a shaft (8) that is used to position and guide the first (1) and second (2) elements, this shaft (8) extending along the axis of rotation (3).

In this example, the discs (7a, 7b) each have 18 teeth (42), each tooth of one disc (7a) being radially aligned with a tooth of the other disc (7b) symmetrically with respect to the transverse median plane of the magnet (6). The first movable element (1) has a set of 24 teeth (41), part of these teeth not being visible due to the partial cut made on the first movable element (1). Due to the permanent magnet (6) whose magnetic flux passes through all of the teeth (41, 42), the latter form magnetic poles attracting one another in order to maximize the overall magnetic flux passing through the air gap between the first movable element (1) and the second fixed element (2), between the teeth (41) and (42). A set of stable and unstable positions is thus formed as well as a periodic stress that can be felt by the user activating the first movable element (1), in the form of successive notches. Due to the different number of teeth (41, 42) between the first movable element (1) and the second fixed element (2), the number of notches felt is then equal to the least common multiple (LCM) of the two numbers of magnetic poles to the first movable element (1) and to the second fixed element (2). In this example, the number of notches felt will be 72, which is the LCM of 18 and 24. The amplitude of the torque created and felt by the user can be adjusted by the axial dimension of the first (1) and second (2) elements as well as by the air gap between the first movable part (1) and the second fixed part (2). The shape of the teeth (41, 42) also makes it possible to play on this parameter as well as on the shape of the torque obtained over a period.

Figure 2:
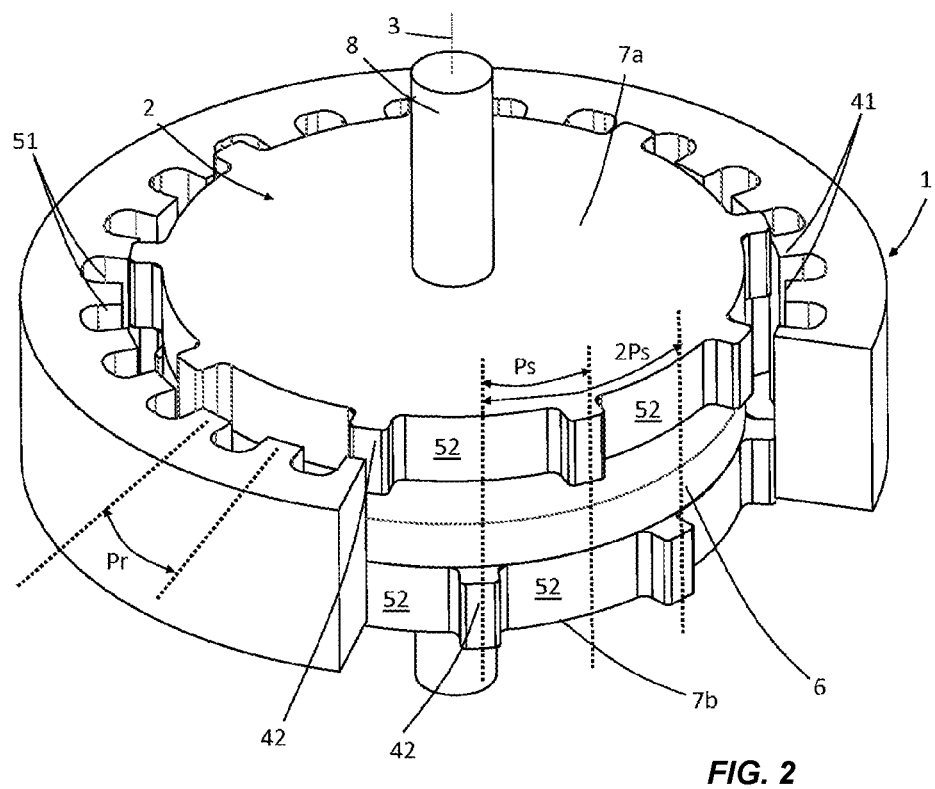
FIG. 2, a partial sectional view of a device according to a second embodiment of the present disclosure.

FIG. 2 shows an alternative embodiment of FIG. 1 for which only the discs (7a, 7b) differ. Each of these discs has 8 teeth (42), the teeth (42) of each disc (7a, 7b) being angularly out of phase by half a period so that a tooth (42) of the disc (7a) is aligned with the middle of a notch (52) of the disc (7b) and vice versa. This variant makes it possible to minimize the number of teeth to be produced on each of the discs while maintaining the same number of notches felt by the user, here 72. The amplitude of the haptic sensation is, however, lower in this case compared to the first embodiment presented in FIG. 1, due to the greater magnetic reluctance generated. In this embodiment, the discs (7a, 7b) are each extended radially by a plurality $2\pi(2*Ps)$ of periodic teeth spaced from the pole pitch Ps multiplied by 2 and spaced between each disc of the pitch Ps expressed in radians.

Figure 3:
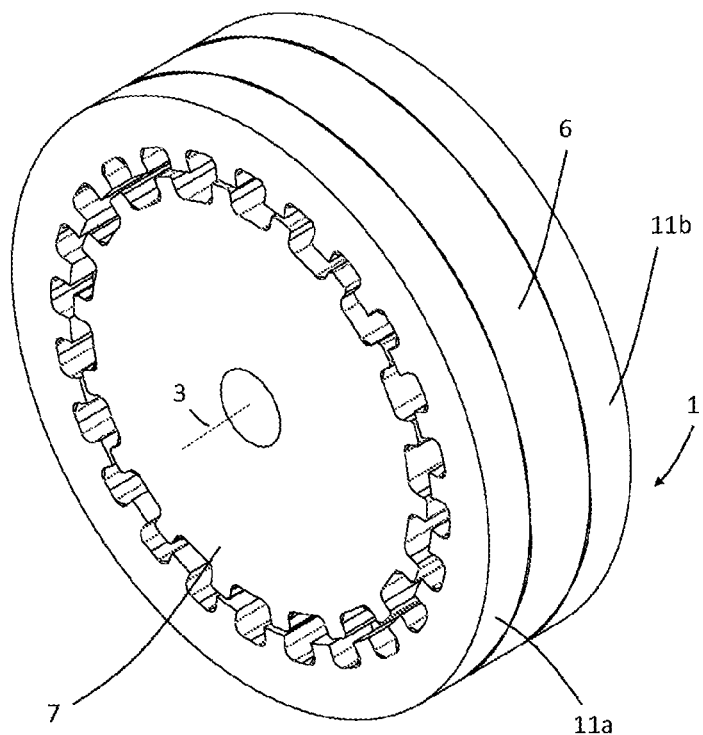
FIG. 3, a perspective view of a device according to a third embodiment of the present disclosure.

FIG. 3 shows an alternative embodiment of FIG. 1 for which the position of the magnet (6) is different, here installed in the first movable element (1), between two toothed discs (11a, 11b). The magnet (6) is in the form of an axially magnetized ring. The second fixed element (2) is in the form of a single toothed disc (7). In this example, as in all the examples given here, the greatest number of teeth can be installed either on the first movable element (1) or on the second fixed element (2) without this going beyond the scope of the present disclosure. Likewise, as in the other embodiments shown, a shaft (8) is not systematically necessary or shown. Finally, for rotary embodiments, the first movable element (1) may be installed outside or inside the second fixed element (2).

Figure 4:
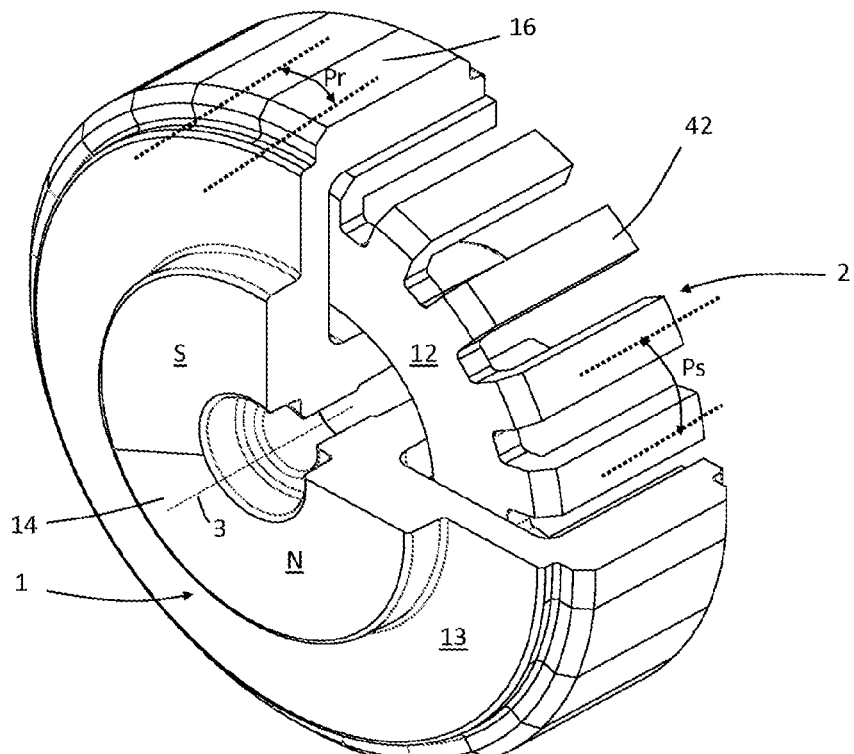
FIG. 4, a partial sectional view of a device according to a fourth embodiment of the present disclosure.

FIG. 4 shows a variant for which the magnetic interaction is carried out via a radial air gap between the first movable element (1) and the second fixed element (2). The second fixed element (2) has a ring (12) extended axially by a set of teeth (42) made from soft ferromagnetic material radially facing a magnetic ring (16) at the first movable element (1). This first movable element (1) here is in the form of one and the same part, made from an injectable material that can magnetize itself permanently, such as a magnet with a plastic binder. The magnet ring (16) is thus extended radially by a disc part (13), which in turn is extended axially by a magnetized plate (14). This plate (14) has here, in a non-limiting manner, two axially magnetized poles (N, S). These two magnetized poles (N, S) are not intended to cooperate magnetically with the teeth (42) of the second fixed element (2), but are intended to detect the position of the first movable element when these magnetized poles (N, S) are opposite a Hall probe or a magneto-resistive probe, for example (not shown here).

This solution of FIG. 4 is particularly advantageous for producing an economical industrial solution, in particular, when produced in a small size (typically with a total diameter of less than 20 mm). Indeed, in addition to the main advantage proposed by the present disclosure, linked to the use of a different number of opposite magnetic poles in order to create a greater number of notches felt by the user, facilitating industrial production, manufacturing the first movable element (1) in a single piece and in a material that can be magnetized is particularly practical and economical, in particular, with a view to implementing a position sensor. This position detection function will be of particular interest when the haptic interface controls computer software or an electrified function in a vehicle.

Figure 5:
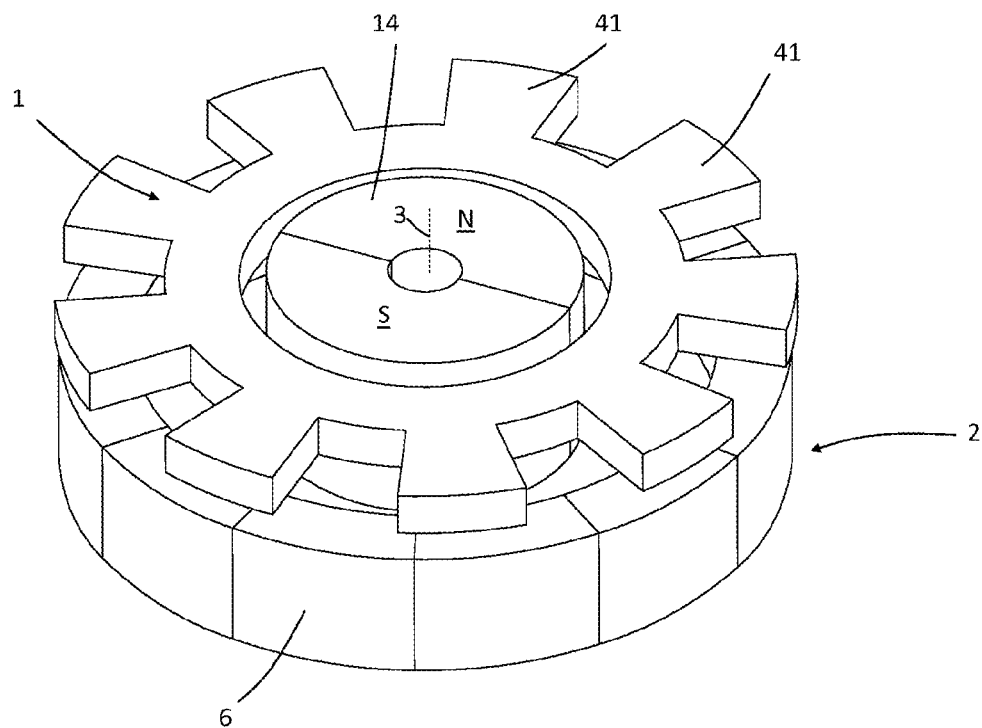
FIG. 5, a perspective view of a device according to a fifth embodiment of the present disclosure.

FIG. 5 shows an axial variant embodiment, that is to say, for which the first movable element (1) is axially facing the second fixed element (2). In this example and more particularly, the teeth (41) of the first movable element (1), in the form of a soft ferromagnetic material, extend radially and axially face the magnet ring (6) of the second fixed element (2). The first movable element (1) has 9 teeth (41) and the second fixed element (2) has a magnet (6) with 12 North and South poles so as to create 36 felt notches. The direction of magnetization here is radial or preferably axial, which makes it possible to modify the amplitude of the torque felt. Still in this example, the first movable element (1) can become fixed and the second fixed element (2) can become movable, without this changing the general function described. Likewise, in this example and in the center of the device, a magnetic plate (14) is shown having a north pole (N) and a south pole (S) serving to detect the relative position of the two elements (1 and 2) when this plate (14) is opposite a magneto-sensitive probe (not shown here).

Figure 6:
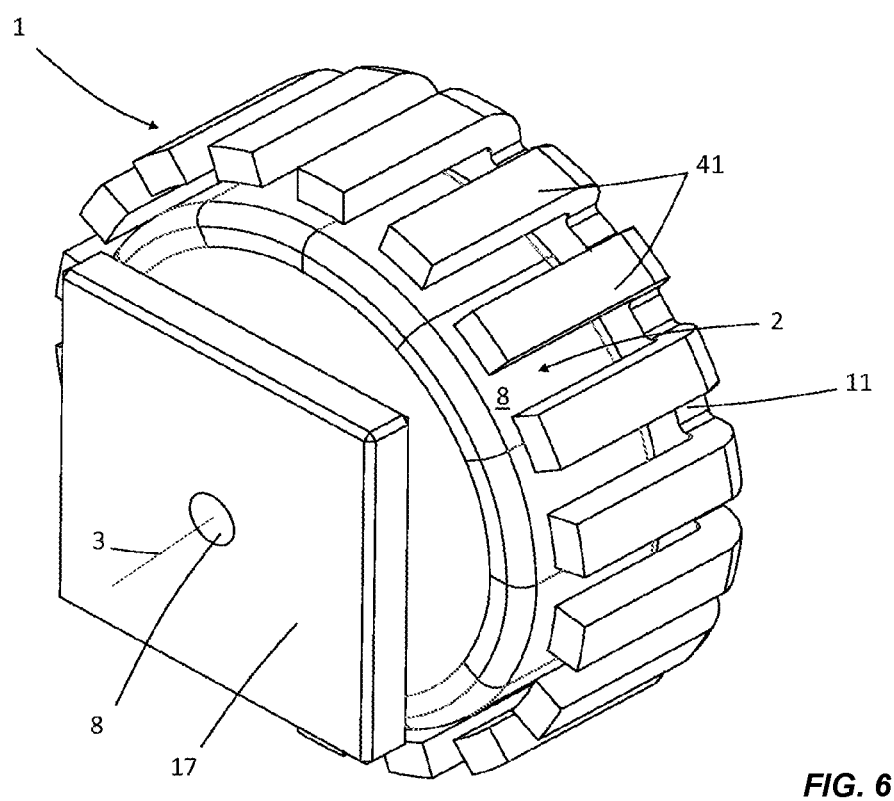
FIG. 6, a perspective view of a device according to a sixth embodiment of the present disclosure.

FIG. 6 shows an alternative to the example shown in FIG. 4 for which the first movable element (1) has teeth (41) extending axially from a plate (11), the assembly being made from a soft ferromagnetic material. The second fixed element (2) has a magnetic ring (6) comprising an alternation of north and south poles oriented radially and facing the teeth (41) radially. The rotation of the first movable element (1) is carried out around a shaft (8) fixed in a support (17) or sliding in this support (17).

Figure 7:
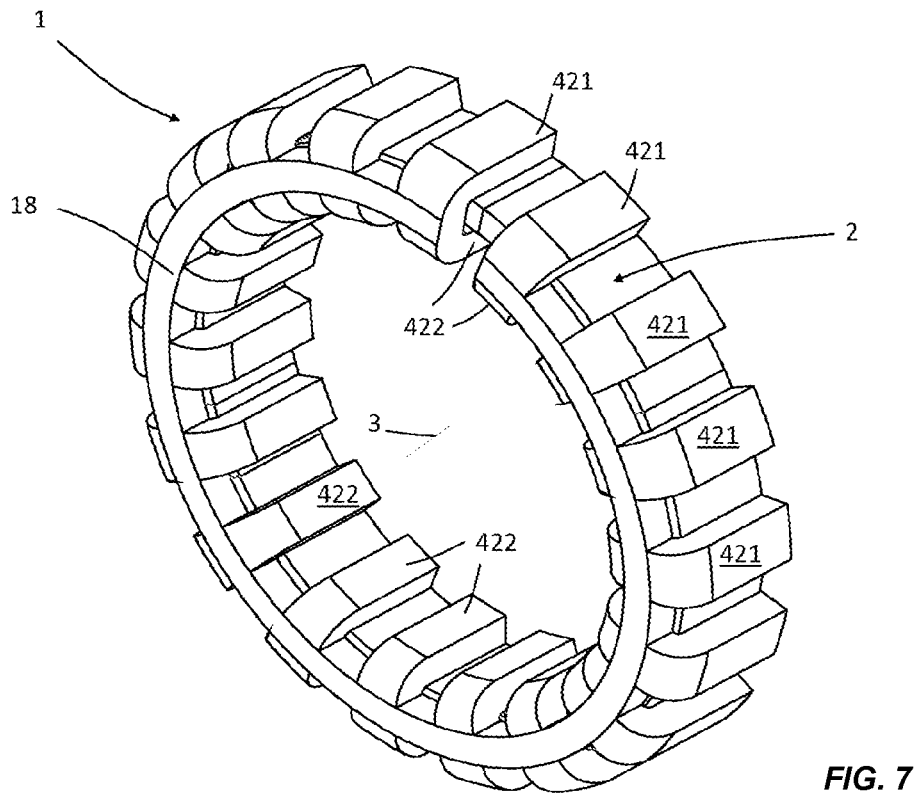
FIG. 7, a perspective view of a device according to a seventh embodiment of the present disclosure.

FIG. 7 is an alternative embodiment for which the first movable element (1) is in the form of a ferromagnetic loop (18) extended axially periodically by pairs of teeth (421, 422) forming an air gap in which is placed the second fixed element (2) in the form of a multipolar magnetic ring (6) that is preferably magnetized radially. In this example, the first movable element (1) may advantageously be produced in the form of a strip of material cut from a sheet of ferromagnetic material and then folded locally in order to produce the pairs of teeth (421, 422).

Figure 8:
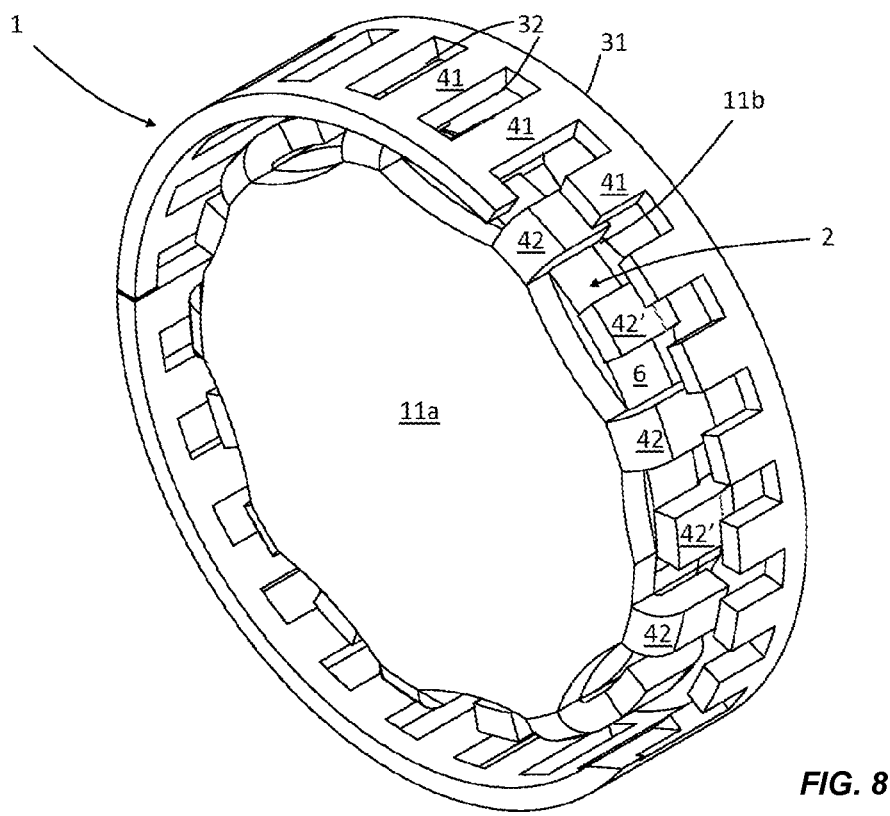
FIG. 8, a perspective view of a device according to an eighth embodiment of the present disclosure.

FIG. 8 shows a variant where the first movable element (1) is in the form of a ring (31) periodically having recesses (32) to form teeth (41) that are periodically spaced apart. In the illustration, part of the ring (31) is not shown so as to better appreciate the second fixed element (2) in the form of a magnet (6) whose magnetic orientation is axial along the axis (3), between two discs (11a, 11b) made from soft ferromagnetic material. These discs (11a, 11b) are extended axially by teeth (42, 42')—for example, the teeth (42) are north poles and the teeth (42') are south poles—so that the teeth (42, 42') face one another and are all radially opposite the ring (31). All the teeth (41, 42, 42') form magnetic poles that work together to form a magnetic interaction and to create a notch felt by the user who manipulates the ring (31).

Figure 9:
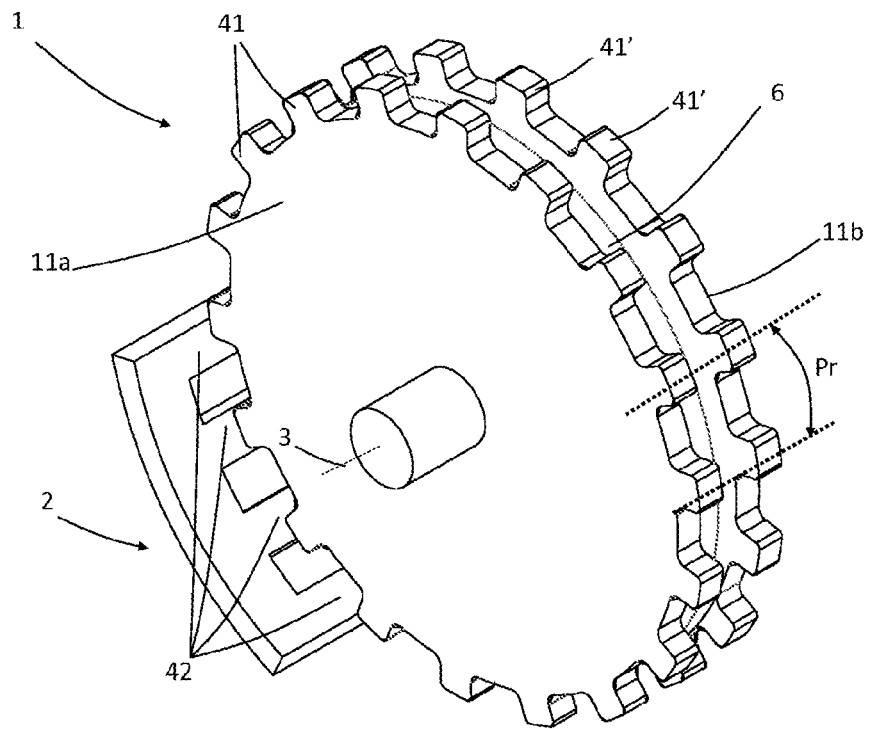
FIG. 9, a perspective view of a device according to a ninth embodiment of the present disclosure.

FIG. 9 illustrates an alternative embodiment showing that the present disclosure, in rotary cases, is not limited to elements extending over 360°. The first movable element (1) has a cylindrical magnet (6) that is magnetized axially and placed between two discs (11a, 11b) extended radially by teeth (41, 41') forming an alternation of North and South magnetic poles. For example, the teeth (41) of the disc (11a) have a North polarity and the teeth (41') have a South polarity imposed by the magnet (6), the teeth (41, 41') being axially aligned. In this example, there are 18 teeth (41) and 18 teeth (41') in order to make 18 pairs of magnetic poles defining a pole pitch Pr. If one wishes to produce 72 notches felt by the user, it is possible to use a second fixed element (2) with 24 teeth (42) made from soft ferromagnetic material, as explained above. However, it is not necessary to keep these 24 teeth to produce 72 felt notches. Indeed, the amplitude of the torque felt is proportional to the greatest common divisor (GCD), which represents the number of patterns present in the interaction between the two elements (1, 2). In the present example, to produce 72 notches, the GCD is 6, which means that there is potentially a succession of 6 patterns generating the torque. It is then possible to use a single pattern for one of the elements, that is to say, 24/6=4 teeth (42) on the second fixed element (2), or any multiple of 4 teeth (42). In this example, 1 pattern—and therefore 4 teeth (42)—is used over an angular extension of 60°. The amplitude of the torque felt is proportional to the number of patterns, which implies a less significant felt stress in this example than in the case where a second complete fixed element (2) extending over 360° is used.

Figure 10:
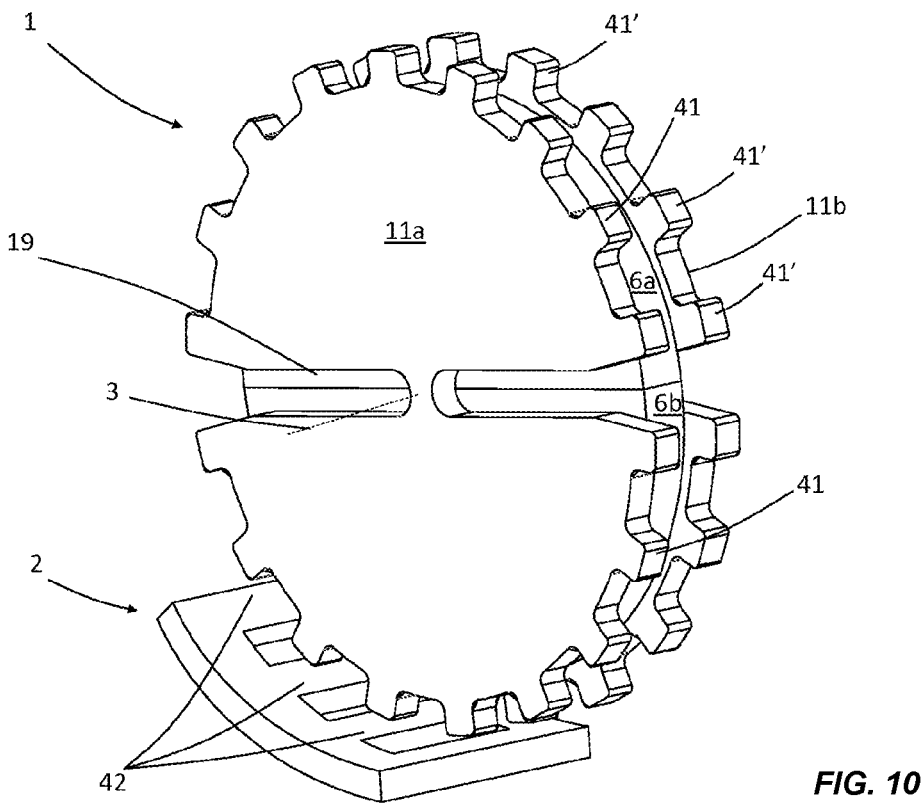
FIG. 10, a perspective view of a device according to an alternative embodiment in FIG. 9, according to the present disclosure.

FIG. 10 shows an alternative embodiment of this FIG. 9 that differs from the latter in that the permanent magnet (6a, 6b) used is bipolar, still axially magnetized—not visible in the figure—the magnet (6a) having a given axial polarity, the magnet (6b) having an opposite axial polarity. A slot (19) passes through the disc (11a) in order to produce a magnetic cut and promote magnetic field leakage out of the disc (11a), the diametrical extent of the slot being parallel to the magnetic transition of the magnet (6a, 6b). The disc (11b) has 2*9 teeth (41') and the disc (11a) has 2*9 teeth (41). The total number of teeth (41, 41') per disc (11a, 11b) is still 18, but the magnetic leakage flux, axially facing the disc (11a), can be used for a position detection function when a magneto-sensitive probe (not shown here) is placed opposite the disc (11a).

Figure 11:
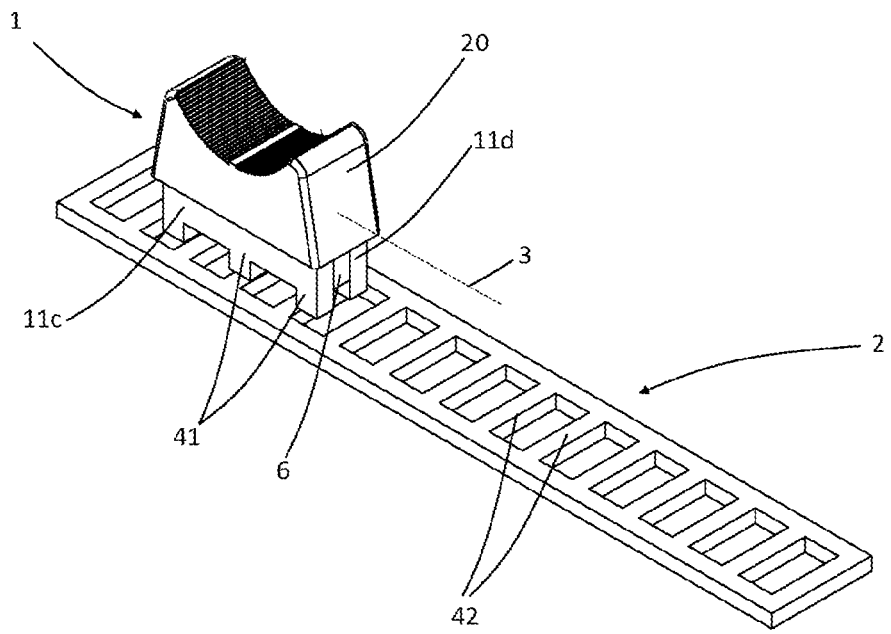
FIG. 11, a perspective view of a device according to a linear variant of the present disclosure.

FIG. 11 shows a linear variant of a device according to the present disclosure. The first movable element (1) is in the form of a cursor (20)—of the "fader" type for an audio mixer—secured to a magnet (6) caught between two toothed elements (11c, 11d) each transversely extended by 3 teeth (41). These teeth (41) are opposite a target made from soft ferromagnetic material forming the second fixed element (2) extending linearly and comprising teeth (42) forming bars and above which the cursor (20) moves along the axis (3), the first movable element (1) being separated from the second fixed element (2) by an air gap maintained by a guide, not shown here. In this example, for a desired notch whose linear pitch is Pt, considering a rotary equivalent where one would have 72 notches felt over a complete revolution with a first movable element (1) with 18 magnetic periods and a second fixed element (2) with 24 magnetic periods, the linear period of the teeth (41) of the first movable element (1) must then be equal to Pr=72/18*Pt and the period of the ferromagnetic poles of the second fixed element (2) must then be equal to Ps=72/24*Pt. Since the GCD of 18 and 24 is 6, there is therefore a single 3-tooth pattern that can be used at the first movable element (1). If one wishes, for example, to obtain a notching every 1 mm, it is necessary for the teeth (41) to have a periodicity of Pr=4 mm and for the ferromagnetic poles of the second fixed element (2) to have a periodicity of Ps=3 mm. In this figure, the second fixed element (2) has a length of approximately 43 mm for a stroke of approximately 33 mm and as many notches felt by the user.

Figure 12:
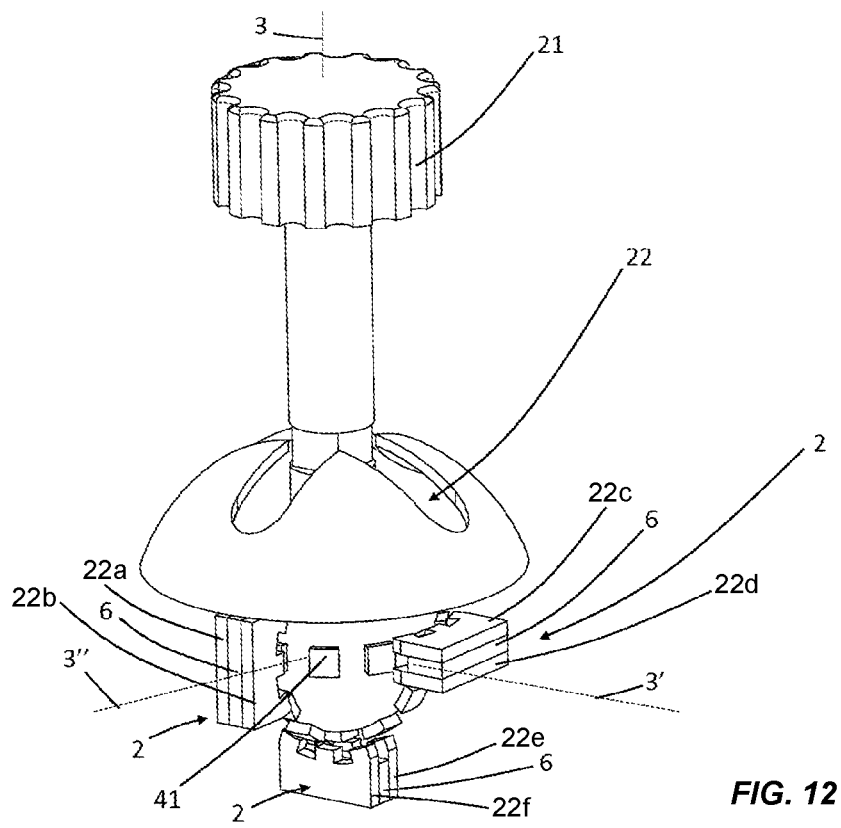
FIG. 12, a perspective view of a spherical variant embodiment of the present disclosure.

FIG. 12 shows a spherical variant of a device according to the present disclosure allowing a haptic feeling by the user during the rotation of a handle (21) actuating a ball joint (22), here along three orthogonal axes (3, 3' and 3"). In this example, the formation of which is a non-limiting example, the ball joint (22) has a plurality of poles made from soft ferromagnetic material that move, when the handle (21) is actuated, in front of three pairs of fixed elements (2), formed from a stack of sheets of soft ferromagnetic materials (22a, 22b), (22c, 22d) and (22e, 22f) on either side of discrete permanent magnets (6), preferably oriented perpendicular to the sheets (22a, 22b), (22c, 22d) and (22e, 22f), which are extended radially by teeth (42) facing the ball joint (22) in order to interact magnetically with the ball joint (22), the latter being separated from the fixed elements (2) by a small radial air gap. The ball joint (22) is guided by an additional element not shown here. The sizing of this variant will be done based on the teachings of the variant of FIG. 11.

FIGS. 13A and 13B are two different perspective views of the same embodiment, with FIG. 13 showing a partial section, quite similar to that of FIG. 4, which differs from the latter by the number of magnetized poles and the number of ferromagnetic poles. In this example, the first movable element (1) has a magnetic ring (16) with 8 North-South polarities oriented radially and the second fixed element (2) has a ring (12) made from ferromagnetic material extended axially by 6 teeth (42), the first (1) and second (2) elements facing one another radially. This configuration makes it possible to generate a stress at 24 periods per revolution. A hub (23) is secured to the ring (12) in order to allow the guiding and the rotation of the first movable element (1) relative to the second fixed element (2). As in the previous examples, the movable element can become fixed and the fixed element can become movable, the relative movement being the same.

FIGS. 14A and 14B are in all points similar to FIGS. 13A and 13B, except that the second fixed element (2) has only 3 teeth (42) extending the ferromagnetic ring (12). The number of notches obtained is thus the same, that is to say, 24, but according to a lower amplitude of the stress obtained, due to the lower number of magnetic interactions, by a higher overall magnetic reluctance.

Figure 15:
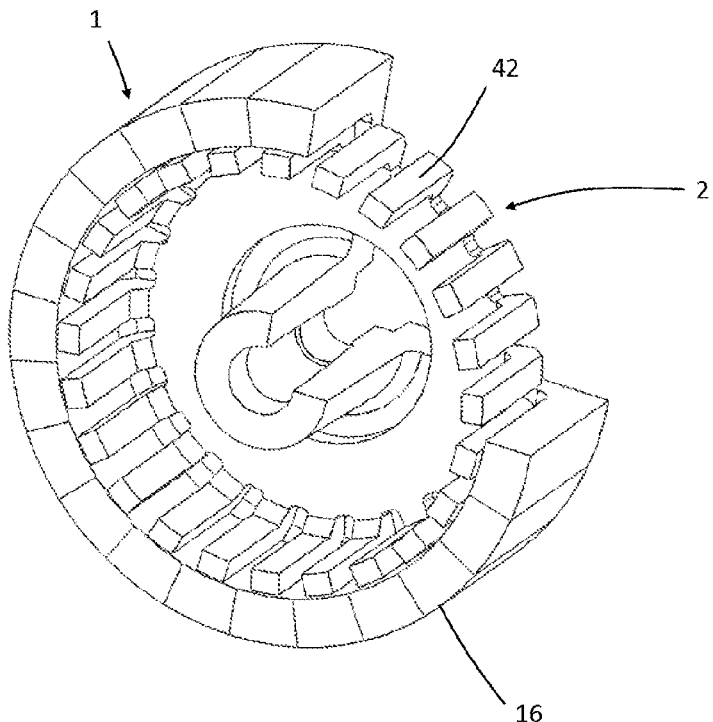
FIG. 15, another rotary variant of FIG. 4.

FIG. 15 shows an embodiment similar to that of FIG. 4 for which the first (1) and the second (2) elements each comprise 24 poles in order to produce 24 notches.

Figure 16:
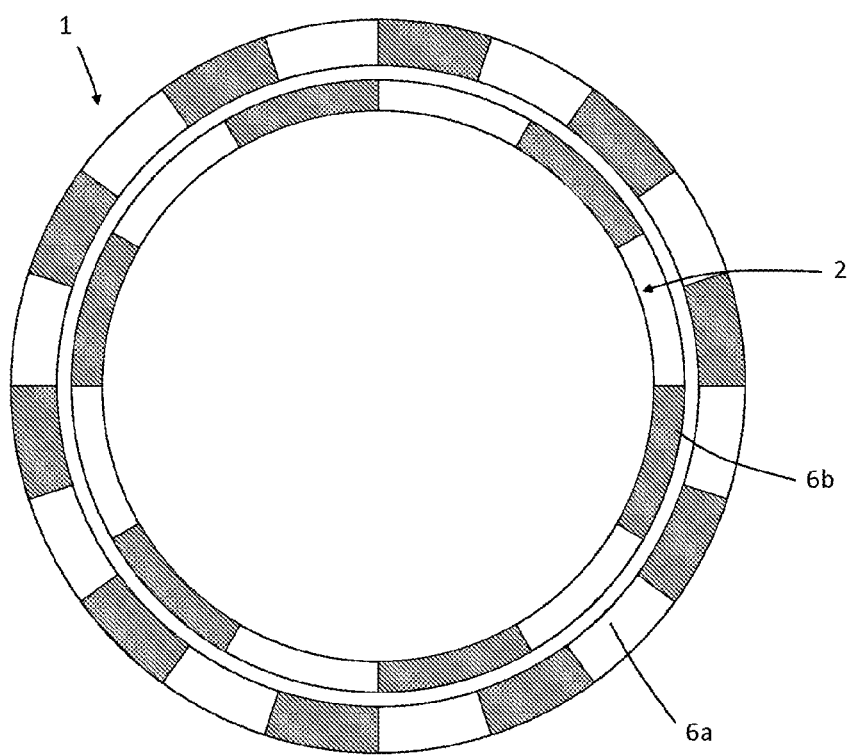
FIG. 16, a rotary variant that uses two permanent magnets.

FIG. 16 shows a final embodiment in which the first movable element (1) and the second fixed element (2) comprise a permanent magnet, respectively (6a) and (6b). In this nonlimiting example, there are 20 polarities for the magnet (6a), preferably oriented radially, and 12 polarities for the magnet (6b), in order to produce 60 notches.

The invention claimed is:

1. A passive haptic interface, comprising:
a movable first element; and
a fixed second element;
wherein the movable first element is rotatably or translatably movable relative to the fixed second element, and the movable first element is configured to rotate or move opposite the fixed second element; and
wherein the movable first element has a first plurality of magnetic poles spaced periodically at a pole pitch Ps and in a direction of movement of the movable first element relative to the fixed second element, the fixed second element having a second plurality of magnetic poles spaced periodically at a pole pitch Pr and in the direction of movement, where Ps and Pr are different numbers;
wherein a periodic stress is created by the magnetic interaction between the movable first element and the fixed second element in a period Pt; and
wherein the periodic stress is created without an electrically conductive coil and without electrical energy.

2. The passive haptic interface according to claim 1, wherein the movable first element is rotatably movable about an axis or translatably movable along an axis, the movable first element rotating or moving opposite the fixed second element, the movable first element having a first plurality of magnetic poles spaced periodically at a pole pitch Ps and in the direction of movement, the fixed second element having a second plurality of magnetic poles spaced periodically at a pole pitch Pr and in the direction of movement, where Ps and Pr are different numbers, a periodic stress being created by the magnetic interaction between the movable first element and the fixed second element in a period Pt, wherein Ps and Pr are chosen such that Pt is strictly less than the smallest of the pitches Ps and Pr.

3. The passive haptic interface according to claim 1, wherein the passive haptic interface is a rotary passive haptic interface, and the number of periods of the periodic stress is equal to the least common multiple of the numbers of periods of magnetic poles at the movable first element and at the fixed second element.

4. The passive haptic interface according to claim 3, wherein one of the movable first element or the fixed second element comprises a cylindrical permanent magnet having an alternation of North and South poles forming the first plurality of magnetic poles, the other of the movable first element or the fixed second element having a plurality of teeth connected by a ring and forming the second plurality of magnetic poles, the teeth and ring being made of a soft ferromagnetic material, the period Pt of magnetic interaction being at least two times less than the smallest of the pitches Ps and Pr.

5. The passive haptic interface according to claim 1, wherein the passive haptic interface is a rotary passive haptic interface, and the movable first element and the fixed second element comprise a permanent magnet having an alternation of North and South poles forming the pole pitches Ps and Pr.

6. The passive haptic interface according to claim 1, wherein the passive haptic interface is a rotary passive haptic interface, and the fixed second element comprises a magnet having a unidirectional magnetization oriented along an axis and comprises, axially on either side, two ferromagnetic discs made from soft iron extended radially and each by a plurality of $2\pi/Ps$ periodic teeth spaced by the pole pitch Ps expressed in radians.

7. The passive haptic interface according to claim 1, wherein the passive haptic interface is a rotary passive haptic interface, and the fixed second element comprises a magnet having a unidirectional magnetization oriented along an axis and comprises, axially on either side, two ferromagnetic discs made from soft iron extended radially and each by a plurality of $2\pi/(2*Ps)$ periodic teeth spaced by the pole pitch Ps multiplied by 2 and spaced between each disc of the pitch Ps expressed in radians.

8. The passive haptic interface according to claim 1, wherein the passive haptic interface is a rotary passive haptic interface, and the movable first element comprises two discs axially on either side of a unipolar permanent magnet and the fixed second element comprises a disc comprising a soft ferromagnetic material, the discs each being extended radially by teeth, respectively, radially facing one another and spaced by the pitch Ps.

9. The passive haptic interface according to claim 1, wherein the passive haptic interface is a linear passive haptic interface, the movable first element comprising a permanent magnet magnetized transversely to the movement of the movable first element along an axis and positioned transversely between two toothed elements made from a soft ferromagnetic material having teeth and in that the fixed second element is made from a ferromagnetic material comprising teeth forming bars and extending linearly, the first movable element moving linearly above the fixed second element.

10. The passive haptic interface according to claim 1, wherein the passive haptic interface is a spherical passive haptic interface, and the movable first element comprises a ball joint capable of moving in rotation about three orthogonal axes, the ball joint comprising a set of teeth extending radially, the fixed second element including a plurality of fixed elements in the form of a stack of sheets of soft ferromagnetic material on either side of discrete permanent magnets oriented perpendicularly to the sheets, the sheets being extended radially by teeth facing the ball joint.

11. The passive haptic interface according to claim 1, wherein the passive haptic interface is a spherical passive haptic interface, and the movable first element comprises a ring of permanent magnets extending axially secured to a disc part, the disc part being extended axially in a direction opposite the magnets by a magnetic plate used for the position detection of the movable first element, and the fixed second element comprises a ring made from a soft ferromagnetic material extended by teeth facing the ring of permanent magnets.

12. The passive haptic interface according to claim 11, wherein the ring of permanent magnets, the disc part and the magnetic plate are made from a single material with an injected plastic binder that can be permanently magnetized.

13. The passive haptic interface according to claim 11, wherein the disc part is made from an injected plastic binder material on which the magnetic plate is securely fixed.

14. The passive haptic interface according to claim 13, wherein the plate is made from a plastic binder material injected into the disc part.

* * * * *